(12) United States Patent
Berard et al.

(10) Patent No.: US 10,587,599 B2
(45) Date of Patent: Mar. 10, 2020

(54) METHOD OF SENDING DATA FROM A SECURE TOKEN TO A DISTANT SERVER

(71) Applicant: GEMALTO SA, Meudon (FR)

(72) Inventors: Xavier Berard, Gemenos (FR); Antoine Galland, Gemenos (FR)

(73) Assignee: Thales DIS France SA, Meudon (FR)

( * ) Notice: Subject to any disclaimer, the term of this patent is extended or adjusted under 35 U.S.C. 154(b) by 102 days.

(21) Appl. No.: 15/519,669

(22) PCT Filed: Oct. 9, 2015

(86) PCT No.: PCT/EP2015/070765
§ 371 (c)(1),
(2) Date: Apr. 17, 2017

(87) PCT Pub. No.: WO2016/062452
PCT Pub. Date: Apr. 28, 2016

(65) Prior Publication Data
US 2017/0244691 A1    Aug. 24, 2017

(30) Foreign Application Priority Data

Oct. 23, 2014   (EP) ..................................... 14306684

(51) Int. Cl.
*H04L 29/06*         (2006.01)
*H04W 4/50*          (2018.01)
(Continued)

(52) U.S. Cl.
CPC .............. *H04L 63/08* (2013.01); *H04W 4/50* (2018.02); *H04W 12/0017* (2019.01); *H04W 12/0023* (2019.01); *H04W 4/70* (2018.02)

(58) Field of Classification Search
CPC ....... H04W 4/50; H04W 12/02; H04W 12/04; H04W 12/06; H04W 4/00;
(Continued)

(56) References Cited

U.S. PATENT DOCUMENTS 7,353,044 B2    4/2008  Nachef
8,055,529 B1*  11/2011  Jackson ............. G06Q 10/0639
                                                            705/7.29

(Continued)

OTHER PUBLICATIONS

International Search Report (PCT/ISA/210) dated Dec. 9, 2015, by the European Patent Office as the International Searching Authority for International Application No. PCT/EP2015/070765 (4 pages).

(Continued)

*Primary Examiner* — Thanhnga B Truong
(74) *Attorney, Agent, or Firm* — Buchanan Ingersoll & Rooney PC

(57) ABSTRACT

The invention is a method for managing a response from an application embedded in a secure token acting as an UICC, in response to a command requesting opening a proactive session. The command is sent by an applicative server to the secure token via an OTA server providing a security layer. The method comprises the steps of sending another command from the applicative server to the secure token using the security layer provided by the OTA server, and in response to this second command, the secure token send the response of the first command to the applicative server using the security layer provided by the OTA server.

10 Claims, 3 Drawing Sheets

(51) Int. Cl.
*H04W 12/00* (2009.01)
*H04W 4/70* (2018.01)

(58) Field of Classification Search
CPC ......... H04W 12/0023; H04W 12/0017; H04M 3/00; G06F 12/00; G06F 15/16; H04L 63/08
USPC ........... 726/5, 7; 455/420; 713/171; 709/203
See application file for complete search history.

(56) References Cited

U.S. PATENT DOCUMENTS

2011/0295930 A1* 12/2011 Morris .................... H04L 67/42
709/203
2014/0052992 A1* 2/2014 Nozulak ............. H04L 63/0428
713/171

OTHER PUBLICATIONS

Written Opinion (PCT/ISA/237) dated Dec. 9, 2015, by the European Patent Office as the International Searching Authority for International Application No. PCT/EP2015/070785 (5 pages).
ETSI TS 143 019, v8.0.0, "Digital Cellular Telecommuications System (Phase 2+); Subscriber Identity Module Application Programming Interface (SIM API) for Java Card; Stage 2; (3GPP TS 43.019 Version 6.0.0 Release 6); Global System for Mobile Communications", Dec. 2004, pp. 1-25.

* cited by examiner

METHOD OF SENDING DATA FROM A SECURE TOKEN TO A DISTANT SERVER

FIELD OF THE INVENTION

The present invention relates to methods of sending data from a secure token to an distant server. It relates particularly to methods of securely sending a response corresponding to a command initiated by an applicative server.

BACKGROUND OF THE INVENTION

A secure token is a tamper-resistant component able to store data and to provide services in a secure manner. In general, a secure token is a physical component which has a limited amount of memory, a processor with limited capabilities and is devoid of battery. For instance a UICC (Universal Integrated Circuit Card) is a secure token which embeds SIM/USIM applications for telecommunication purposes. A secure token can be installed, fixedly or not, in a terminal, like a mobile phone for example. In some cases, the terminals are constituted by machines that communicate with other machines for M2M (Machine to Machine) applications.

A secure token can be in the format of a smart card. A secure token may be a chip soldered to the mother-board of the host device and constitute an embedded-secure element (eSE).

A secure token can contain several emulated UICC.

A secure token can comprise an application intended to communicate with a distant applicative server. Most of the Telecom solutions rely on a communication protocol based on command/response between an applicative server and an application embedded in a secure token. This protocol is mapped into a secured Command Packet in a SM (short message) MT (mobile terminated) and a secured response packet in a SM MO (mobile originated) for the communication. Such a design can take benefit of the security layer of the communication channel of the Telecom operator for the applicative server to send a command and for the on-token application to send a response. The secure tokens concerned in this invention can utilize such a secure communication channel.

According to ETSI TS 143.019 V6.0.0, the responses are managed by a dedicated handler, called EnvelopeResponseHandler, in the UICC.

The ETSI TS 102 223 describes the principle of a proactive session which allows a UICC to send proactive commands to its hosting device. The proactive commands are managed in the UICC through a specific handler called ProactiveHandler.

Unfortunately, according to the § 6.6 of the ETSI TS 143.019 V6.0.0 the EnvelopeResponseHandler is no more available after the first invocation of the ProactiveHandler. Thus when the applicative server sends a command requesting the opening of a proactive session the token cannot send its response as usual.

There is a need for providing a solution allowing a secure token to send a response to the applicative server in a secure manner after an invocation of the ProactiveHandler.

SUMMARY OF THE INVENTION

An object of the invention is to solve the above mentioned technical problem.

The object of the present invention is a method for managing a response generated by an application which is embedded in a secure token acting as an UICC, in response to a first command requesting opening a proactive session. An applicative server relies on an OTA server to send the first command to the secure token. The first command is secured with a security layer provided by the OTA server. The method comprises the following steps:

the applicative server sends a second command to the secure token, said second command requesting the sending of said response and being secured by the security layer provided by the OTA server, in response to the second command, the secure token builds a secured response packet comprising the response secured with the security layer provided by the OTA server and sends the secured response packet to the OTA server which in turn sends the response to the applicative server.

Advantageously, the secure token may send to the applicative server an intermediate response to said first command, said intermediate response comprising a request for a time extension and said intermediate response being secured with the security layer provided by the OTA server.

Advantageously, the request may comprise a time extension expressed as a fixed duration, an indefinite duration or the occurrence of a specified event.

Advantageously, the secure token may send to the applicative server a message indicating that the response can be retrieved.

Advantageously, the message may be sent directly to the applicative server without using the security layer provided by the OTA server.

Another object of the present invention is secure token acting as an UICC and including an application able to run a first command requesting opening a proactive session. The first command is initiated by an applicative server and secured with a security layer provided by an OTA server. The application is able to generate a response corresponding to the first command. The secure token is configured to handle a second command requesting the sending of the response. The secure token is configured to build a secured response packet comprising the response secured with the security layer provided by the OTA server and to send the secured response packet to the OTA server in response to the second command.

Advantageously, the secure token may be configured to send to the applicative server an intermediate response to said first command, said intermediate response comprising a request for a time extension, said intermediate response being secured with the security layer provided by the OTA server.

Advantageously, the secure token may be configured to send to the applicative server a message indicating that the response can be retrieved.

Another object of the present invention is system including an applicative server and a secure token according to the invention, wherein the applicative server is configured to send the second command after an event and to get the response from the OTA server in response to sending of the second command.

Advantageously, the event may be selected from a set comprising the receipt of a message indicating that the response can be retrieved, a specific duration after the receipt of a request for a time extension at applicative server side and a predefined duration after the sending of the first command.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure token configured to act as a UICC. For example the secure token may be a smart card, an UICC, an embedded-UICC (eUICC), an embedded-SIM or a software-implemented UICC.

The secure token may be coupled to any type of host machine having a baseband and able to establish a communication session with the secure token. For example the host machine may be a mobile phone, a tablet PC, a vehicle, a meter, a slot machine, a TV or a computer.

Figure 1:
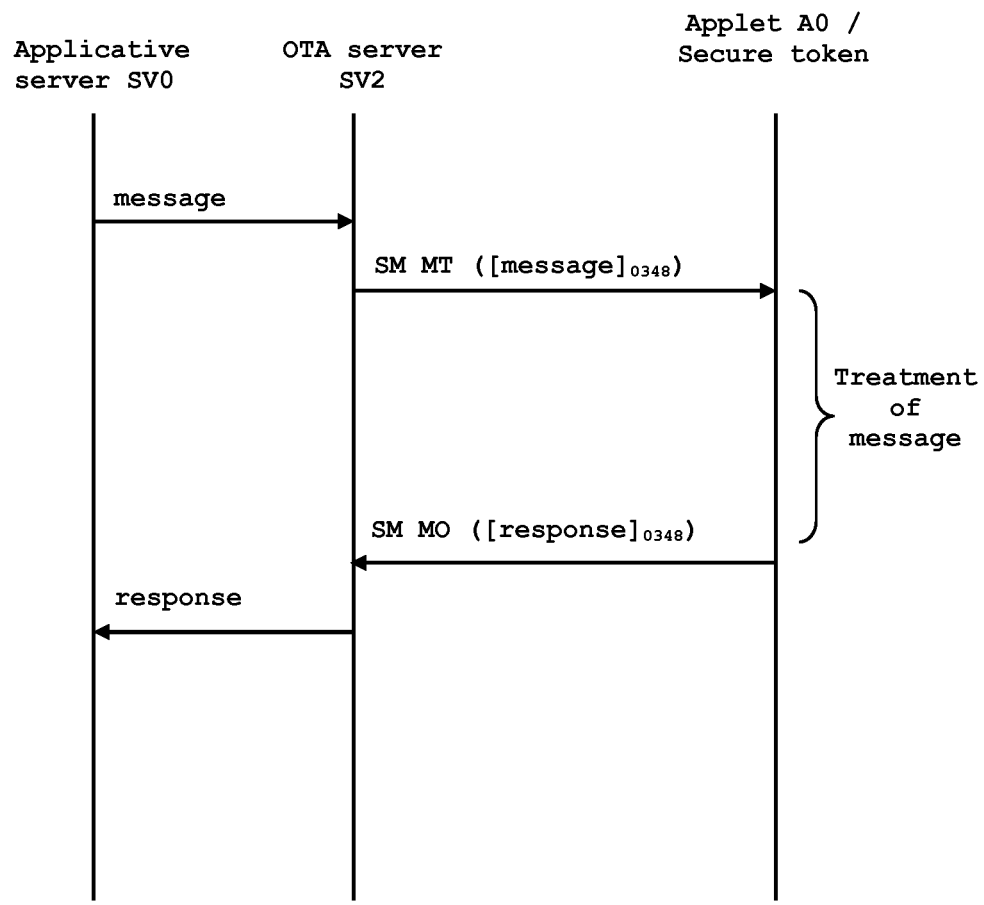
FIG. 1 depicts a first example of message exchange between an applicative server and an applet (that is, an application) embedded in a secure token according to the prior art.

By way of illustration, FIG. 1 shows a first example of message exchange between an applicative server SV0 and an applet A0 embedded in a secure token according to the prior art.

Over The Air mechanism (also known as OTA) is defined inter alia by the GSM 03.40, GSM 03.48 and ETSI/SCP-3GPP-3GPP2 standards. These documents specify specific protocols and a security layer known as "03.48 security layer".

The applicative server SV0 sends a command through a message to the OTA server SV2. Then the OTA server SV2 builds a SM MT containing the message. The OTA server SV2 secures the content of the SM MT by using the 03.48 security layer. Then the applet deciphers the received SM MT, executes the command, generates a response, and provides the response to the EnvelopeResponseHandler. Then the operating system of the secure token builds a SM MO, and sends it to the OTA server through the 03.48 security layer. Then the OTA server deciphers the SM MO, retrieves the response and sends the response to the applicative server SV0.

In the state of the art, the sending of the command and its corresponding response is secured by the same security layer.

Figure 2:
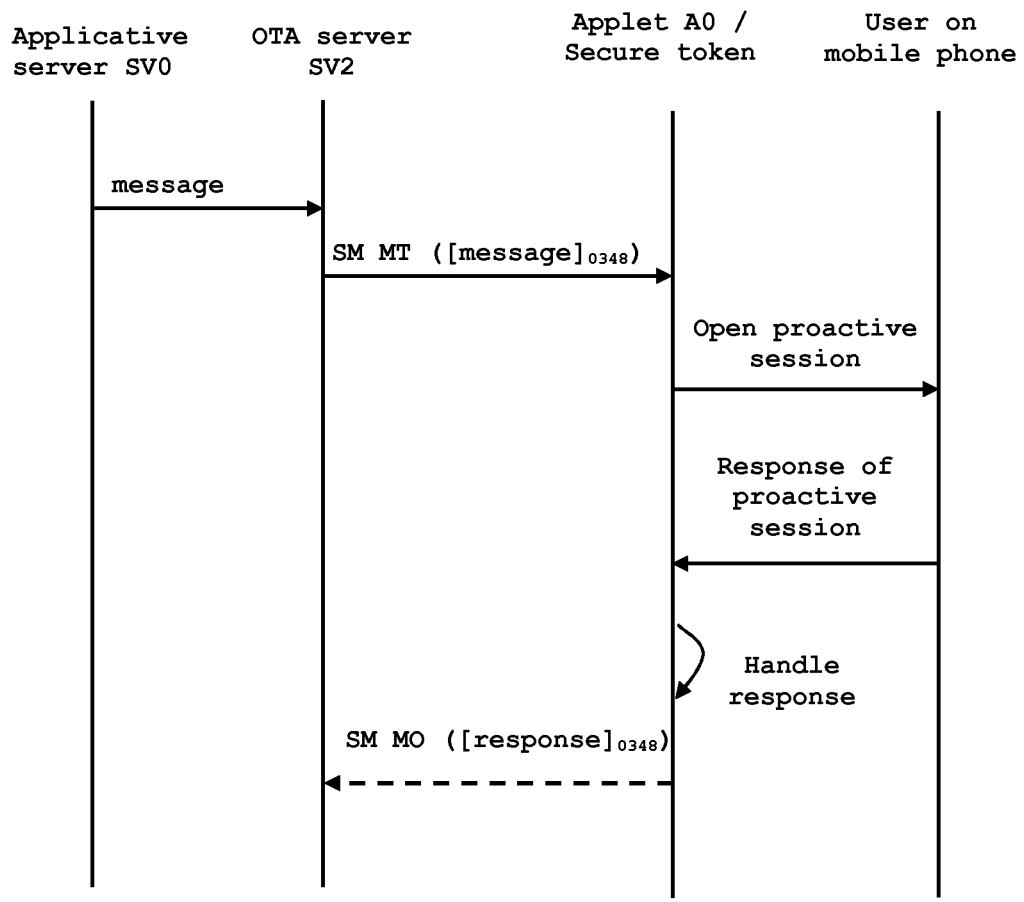
FIG. 2 depicts a second example of message exchange between an applicative server and an applet embedded in a secure token according to the prior art.

FIG. 2 shows a second example of message exchange between the applicative server SV0 and the applet A0 embedded in a secure token according to the prior art.

In this example, the command initiated by the applicative server SV0 requests the applet A0 to open a proactive session. The command is sent from the applicative server SV0 to the applet A0 in a way similar to the example of FIG. 1. For example, the proactive session may wait for a data selected by the user of the mobile phone hosting the secure token. When the applet A0 must send the response corresponding to the received command, the 03.48 security layer is no more available. The EnvelopeResponseHandler content must be posted before the first invocation of a ProactiveHandler.send method or before the termination of the processToolkit, so that the Applet can offer these data to the mobile equipment (e.g. 9Fxx/9Exx/91xx). After the first invocation of the ProactiveHandler.send method the EnvelopeResponseHandler is no more available. The SM MO containing the response cannot be transmitted in the same way it was sent in the example of FIG. 1. The dotted line shows that the message cannot be sent.

Figure 3:
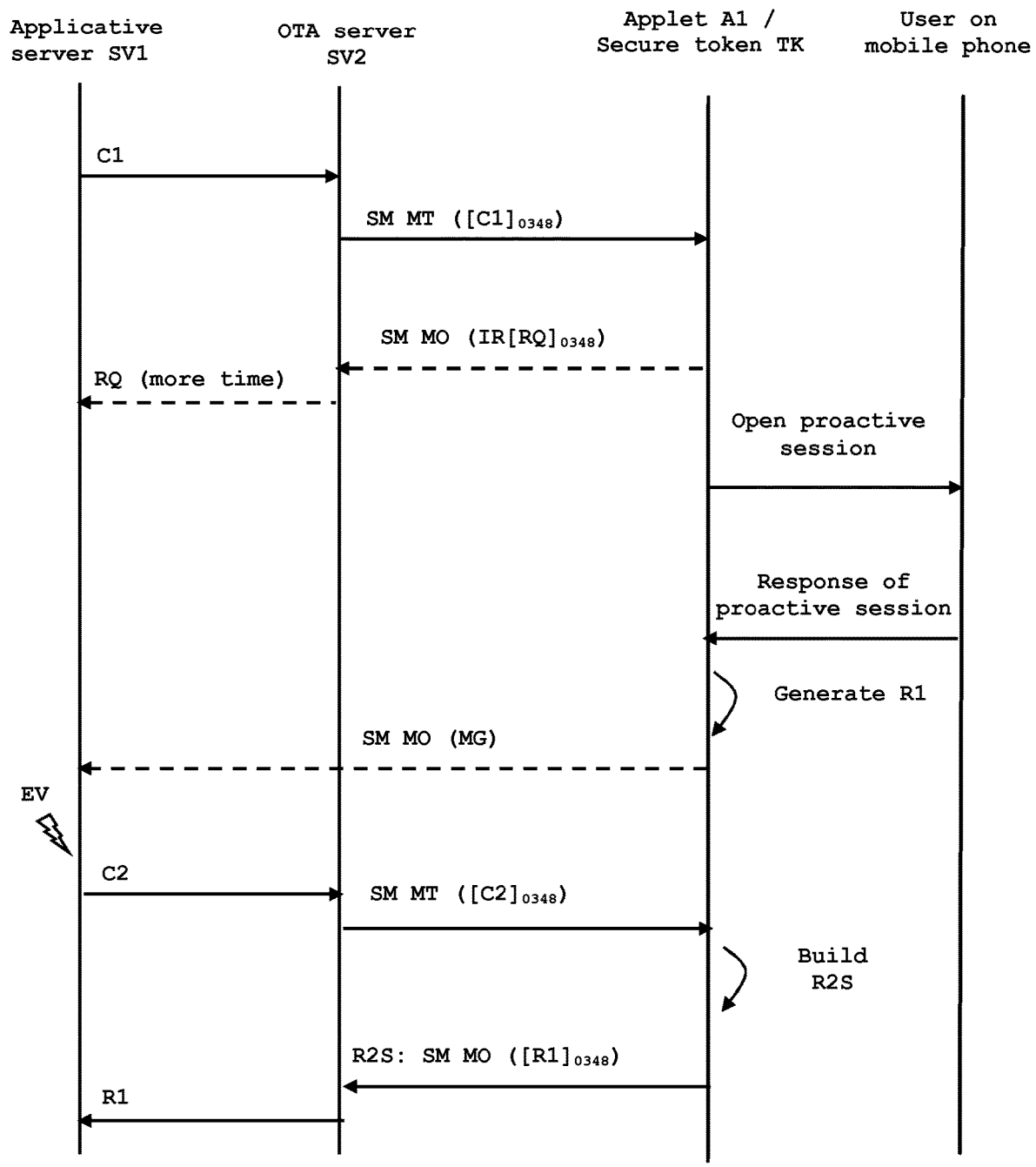
FIG. 3 depicts an example of message exchange between an applicative server and an applet embedded in a secure token according to the invention.

FIG. 3 shows an example of message exchange between an applicative server SV1 and an applet A1 embedded in a secure token according to the invention.

In this example, the command C1 initiated by the applicative server SV1 requests the applet A1 to open a proactive session. The command C1 is sent from the applicative server SV1 to the applet A1 in a way similar to the example of FIG. 1. The proactive session may display a data to the user through the screen of the mobile phone. For instance, the proactive Display Text command may be run.

Once the applet A1 has started the proactive session, the secure session established between the OTA server SV2 and the secure token is closed.

The applet generates a response R1 corresponding to the execution of the command C1.

When an event EV occurs, the applicative server SV1 sends another command C2 to the secure token TK. The command C2 requests the sending of the response R1. The command C2 is secured by the security layer provided by the OTA server SV2. In other words, the applicative server SV1 sends the command C2 to the OTA server SV2 which in turn builds a SM MT comprising the command C2 and sends the SM MT to the secure token TK.

Then the secure token TK generates a secured response packet R2S which comprises the response R1 secured with the security layer provided by the OTA server SV2. For example the secured response packet R2S may be a SM MO secured with the 0348 security mechanism.

Then the secured response packet R2S is sent from the secure token to the OTA server SV2 which in turn retrieves the response R1 from the secured response packet R2S and sends the response R1 to the applicative server SV1.

At this point, the applicative server is able to associate the received response R1 with the first command C1.

Advantageously, the secure token TK may send an intermediate response IR to the applicative server SV1 for requesting additional time before opening the proactive session. As shown in dotted line at FIG. 3, the sending of this intermediate response IR is optional. Since the proactive session has not yet started, the intermediate response IR may be securely sent via the OTA server SV2 using the security layer provided by the OTA server SV2. The intermediate response IR comprises a request RQ for a time extension. The time extension can be expressed as a duration fixed by the secure token TK, a duration to be determined by the applicative server SV1 (e.g. indefinite duration) or the occurrence of a specified event. For instance, the specified event may be the receipt of a further message indicating that the response R1 can be retrieved from the secure token TK or the fact that a new communication session must be established with the secure token TK for any reasons.

Advantageously, the secure token TK may send a message MG to the applicative server SV1 for indicating that the response R1 is available at secure token side and can be retrieved. As shown in dotted line at FIG. 3, the sending of this message MG is optional. For example, the secure token TK may directly send to the applicative server SV1 the message MG encapsulated in SM MO. In this case, the message MG is not secured by the security layer provided by the OTA server SV2. On receipt of the message MG, the applicative server SV1 will send the command C2 as described above.

An advantage of the invention is to reuse the security layer of ETSI TS 102 225 for the sending of the applicative command to the secure token. It allows taking benefit of the secure messaging mechanism already designed for secure tokens acting as an UICC. Compared to existing applications, the application A1 does not have to implement an additional function for managing its own security layer.

The invention avoids the management of an additional set of keys (for securing the sending of the response R1) by the applicative server and a fleet of secure tokens.

It must be understood, within the scope of the invention, that the above-described embodiments are provided as non-limitative examples. In particular, the secure token may comprise any number of virtual UICC and the application is not necessarily an applet.

The invention claimed is:

1. A computer-implemented method, comprising the steps:
   a secure token receives from an applicative server via an OTA server a first command requesting opening a proactive session, said first command being secured with a security layer provided by the OTA server, wherein the secure token is a hardware device that implements a universal integrated circuit card,
   the secure token receives from the applicative server a second command, said second command requesting the sending of a response to said first command and being secured by the security layer provided by the OTA server, and
   in response to receipt of the second command, an application embedded in the secure token builds a secured response packet comprising the response secured with the security layer provided by the OTA server and sends the secured response packet to the OTA server which in turn sends the response to the applicative server.

2. A method according to claim 1, wherein the secure token sends to the applicative server an intermediate response to said first command, said intermediate response comprising a request for a time extension, said intermediate response being secured with the security layer provided by the OTA server.

3. A method according to claim 2, wherein the request comprises a time extension expressed as a fixed duration, an indefinite duration or the occurrence of a specified event.

4. A method according to claim 1, wherein the secure token sends to the applicative server a message indicating that the response can be retrieved.

5. A method according to claim 4, wherein, said message is sent directly to the applicative server without using the security layer provided by the OTA server.

6. A secure token including instructions stored thereon that, when executed, cause said secure token to:
   run, by an application of the secure token, a first command requesting opening a proactive session, said first command being initiated by an applicative server and secured with a security layer provided by an OTA server, wherein the application generates a response corresponding to the first command, wherein the secure token is a hardware device that implements a universal integrated circuit card,
   handle a second command requesting the sending of the response, and
   build a secured response packet comprising the response secured with the security layer provided by the OTA server and send the secured response packet to the OTA server in response to receipt of the second command.

7. A secure token according to claim 6, wherein the secure token is configured to send to the applicative server an intermediate response to said first command, said intermediate response comprising a request for a time extension, said intermediate response being secured with the security layer provided by the OTA server.

8. A secure token according to claim 6, wherein the secure token is configured to send to the applicative server a message indicating that the response can be retrieved.

9. A system including an applicative server and a secure token according to claim 6, wherein the applicative server is configured to send the second command after an event and to get the response from the OTA server in response to sending of the second command.

10. A system according to claim 9, wherein the event is selected from a set comprising the receipt of a message indicating that the response can be retrieved, a specific duration after the receipt of a request for a time extension and a predefined duration after the sending of the first command.

* * * * *